D. B. RHODES.
Corn Planter.
No. 7,823.
Patented Dec. 10, 1850.
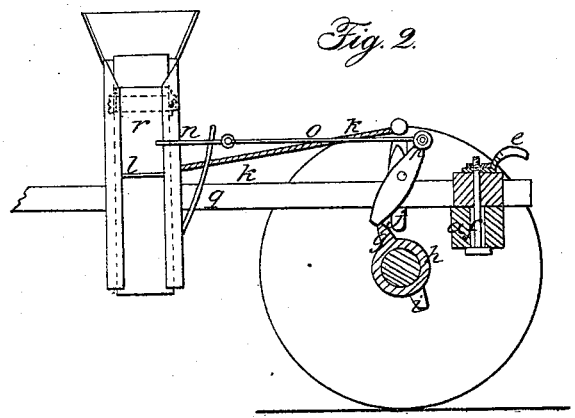
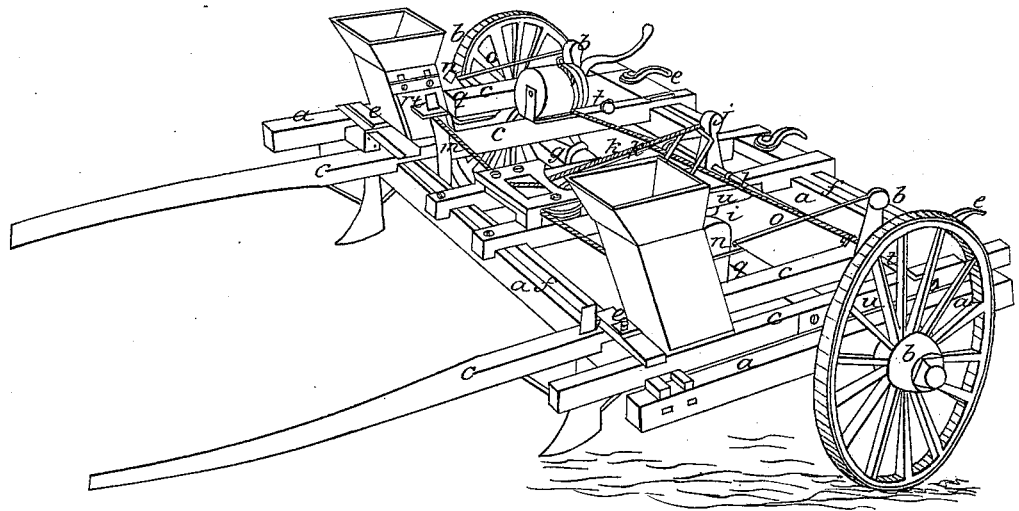

UNITED STATES PATENT OFFICE.

DEXTER B. RHODES, OF CONCORD, NEW YORK.

IMPROVEMENT IN SEED-PLANTERS.

Specification forming part of Letters Patent No. 7,823, dated December 10, 1850.

*To all whom it may concern:*

Be it known that I, DEXTER B. RHODES, of Concord, in the county of Erie and State of New York, have invented certain new and useful improvements in a machine for planting corn and other grain in hills, denominated the "Scientific Planter;" and I do hereby declare that the following is a full, clear, and exact description of the nature, construction, and operation thereof, reference being had to the accompanying drawings and letters marked thereon, forming a part of this specification.

Figure 1 represents a perspective view of the whole machine. Fig. 2 is a section of one of the hoppers, showing the seed-cell and the two sliding bottoms, the movable side, and the manner the sliding bottoms are acted upon by the cams, levers, &c.

The nature of my improvement consists, first, in having two sliding bottoms to each hopper, one of which measures the quantity of seed and the other discharges it into the hills; also, in having one side of each hopper through which the under bottom slides adjustable, so as to regulate the capacity of the seed-cell; secondly, in having the hoppers attached to or setting in adjustable frames, which slide laterally on the top of the carriage-frame for the purpose of regulating the distance between the hills, as hereinafter more fully described.

In the drawings, $a\ a$ represent the carriage-frame, which rests upon the wheels $b\ b$, one of which revolves freely upon its center to assist in turning the machine round. The other is firmly attached to the axle.

$c\ c$ are the adjustable frames, from which project shafts to gear the horse to. The hoppers rest in these frames, to which are attached the drills, levers $p\ p$, and all the apparatus for moving the upper sliding bottoms, and all slide laterally upon the top of the carriage-frame. The frames $c\ c$ are secured at any points of adjustment by means of the nuts or wrenches $e\ e$, which screw onto bolts passing through the slots in the carriage-frame.

The circumference of the wheels $b\ b$, I make equal to the greatest space ever required between the hills, which space is regulated by the number of cams on the axle. In the drawings I have represented only a cam to each set, but propose to have two or more, as may be found necessary to regulate the space between the hills in one direction.

In the middle of the axle I have a stationary cam, $i$, which acts against the lever $j$, to which are attached cords $k\ k$, passing round pulleys to the under sliding bottoms, $l\ l$, of the hoppers to draw them out and discharge the seed. The springs $m\ m$ act in opposition to the cam $i$ and close the sliding bottoms $l\ l$ when the cam has ceased its action against the lever.

The two cams $g\ g$ slide freely upon the axle, so as to be adjusted to correspond with the position of the carriage-frame $c\ c$, and they are held in their position by the screws $h\ h$. These cams act upon the lever and upper sliding bottoms, and draw them in and out in the same manner as the lower ones above described, only there is a cam and lever to each slide, and connecting-rods instead of cords.

$n\ n$ are the upper sliding bottoms, $o\ o$ the connecting-rods, $p\ p$ the levers, and $q\ q$ the springs.

The hoppers, as before stated, are placed in the adjustable frames $c\ c$, and have two sliding bottoms, forming a seed-cell between them. The sliding bottoms slide at right angles to each other, and are drawn in and out, as above described. One side of the hoppers $r\ r$, through which the under bottoms, $l\ l$, slide, I make movable, so as to adjust the seed-cells for measuring a large or small quantity of seed, as may be desired, and which can be secured to any degree of adjustment by means of the screws $s\ s$.

The rods $t\ t$ pass through the levers, and are firmly attached to them, but move freely through their gudgeons on the frames. To each of them are attached cords, which pass over a windlass. By turning the windlass the rods will be drawn through their gudgeons, pulling the levers with them and throwing the machine out of gear. At the ends of the rods $t\ t$, and acting in opposition to the windlass, are springs $u\ u\ u$, which spring the machine into gear.

Operation: The cams $g\ g$, acting at the same time upon the levers $p\ p$, draw both of the upper sliding bottoms out simultaneously, which measures the quantity of seed in the seed-cells, and as soon as the cams have ceased acting the springs close the bottoms. The cam $i$ on the center of the axle acts in its turn after the machine has passed over the space desired upon the lever $j$, which is, connected, as described, to the under sliding bottoms, which bottoms are drawn out and closed in the same manner as the upper ones to discharge the seed into the hills.

The drawings represent my machine for planting seed at every revolution of the wheels; but it is obvious that by placing two or more cams on the axles, so as to act upon the levers two or more times during one revolution of the wheel, the space between the hills in one direction can be easily regulated. The space in the other direction is regulated by the adjustable frames $c\ c$ sliding laterally upon the top of the carriage-frame, as fully described.

The machinery is thrown in and out of gear by the alternate action of the windlass and springs, so obvious as not to require further description.

Having thus described the nature, construction, and operation of my scientific planter, what I claim therein as new, and desire to secure by Letters Patent, is—

The upper and lower sliding bottoms, $n\ n$ and $l\ l$, in combination with the adjustable side of the hoppers $r\ r$, operating in the manner and for the purpose substantially as herein described.

In testimony whereof I have hereunto signed my name before two subscribing witnesses.

DEXTER B. RHODES.

Witnesses:
 JNO. T. BOYLE,
 THOS. DONOHO.